United States Patent [19]

Kyhl

[11] Patent Number: 4,728,184
[45] Date of Patent: Mar. 1, 1988

[54] FOLDABLE TRANSPARENCY ENLARGER FOR OVERHEAD PROJECTOR

[75] Inventor: Henry Kyhl, Englewood, N.J.

[73] Assignee: Buhl Industries, Inc., Fair Lawn, N.J.

[21] Appl. No.: 53,714

[22] Filed: May 26, 1987

[51] Int. Cl.[4] ............................................. G03B 21/28
[52] U.S. Cl. ................................ 353/96; 353/DIG. 5; 353/119; 353/122
[58] Field of Search .......................... 353/119, 65–67, 353/DIG. 1–6, 122, 95, 96, 23, 22

[56] References Cited

U.S. PATENT DOCUMENTS 2,669,156 2/1954 Fitzgerald ................. 353/DIG. 5 X
3,482,911 12/1969 Noble ....................... 353/DIG. 5 X

FOREIGN PATENT DOCUMENTS 2134279 8/1984 United Kingdom ......... 353/DIG. 3

Primary Examiner—Harry N. Haroian
Attorney, Agent, or Firm—McAulay, Fields, Fisher, Goldstein & Nissen

[57] ABSTRACT

A device for supporting a transparency on a top surface of an overhead projector is foldable from a compact unit into a structure having a planar base with an indentation for receiving a transparency and legs which are pivotally mounted on the base and rest on the top of an overhead projector to position the transparency at a specific spacing therefrom. Other pivotal elements position a lens at a given distance above the base so that light from the overhead projector will pass through the transparency and project it on a remote screen without white light showing around the sides of the transparency.

7 Claims, 9 Drawing Figures

FOLDABLE TRANSPARENCY ENLARGER FOR OVERHEAD PROJECTOR

BACKGROUND OF THE INVENTION

The present invention is directed to overhead projectors and specifically to a transparency enlarger therefor.

Overhead projectors in general have a top surface with a glass plate through which light travels along an optical path to an overhead lens so that a transparency placed on the glass plate will be projected onto a remote screen.

A new film that is presently being marketed, specifically a Polaroid 691 film, permits one to take pictures in a Polaroid camera and obtain an actual transparency 10 minutes later. The transparency can then be placed into a mask or holder in a conventional manner. Alternatively, Hatachi provides a transparency from a cathode ray tube via a video printer.

While the use of such self-made transparencies is clearly desirable, a problem is encountered in viewing these transparencies through a conventional overhead projector since the transparencies are only three inches by four inches and white light shows around the sides of the transparency when projected on a screen.

SUMMARY OF THE INVENTION

The main object of the present invention is to provide an enlarger for such a transparency so that when placed on an overhead projector top surface, the transparency will be projected on a remote screen without the undesirable light around the sides of the transparency.

These and other objects of the present invention are carried out in accordance with the present invention by a portable foldable table-like structure which sits directly on the glass projection area of an overhead projector. The table has a mask cut out to accommodate the smaller transparencies so that the transparencies fit within a recess on the table.

The device according to the present invention has a planar base which constitutes the table with means for receiving a transparency including the recess and the mask cutout. Leg means are provided which are mounted on the base for pivotal movement from a storage position wherein the leg means are parallel to and adjacent the base to a support position wherein the leg means extend downwardly to support the base in a position that is parallel to and spaced a predetermined distance from the top surface of the overhead projector. A lens holding means is pivotally mounted on the base and has a planar lens holding member movable from a storage position wherein the planar member is parallel to and adjacent the base, to a working position wherein the lens holding member is parallel to and spaced from and above the base in alignment with the transparency receiving means.

As a result of this structure, the device is unfoldable into a desired working configuration and is collapsible into a compact structure for storage.

These and other objects and advantages of the present invention will be seen from the following detailed description thereof taken with the attached drawings, wherein:

DETAILED DESCRIPTION OF THE INVENTION

Figure 1:
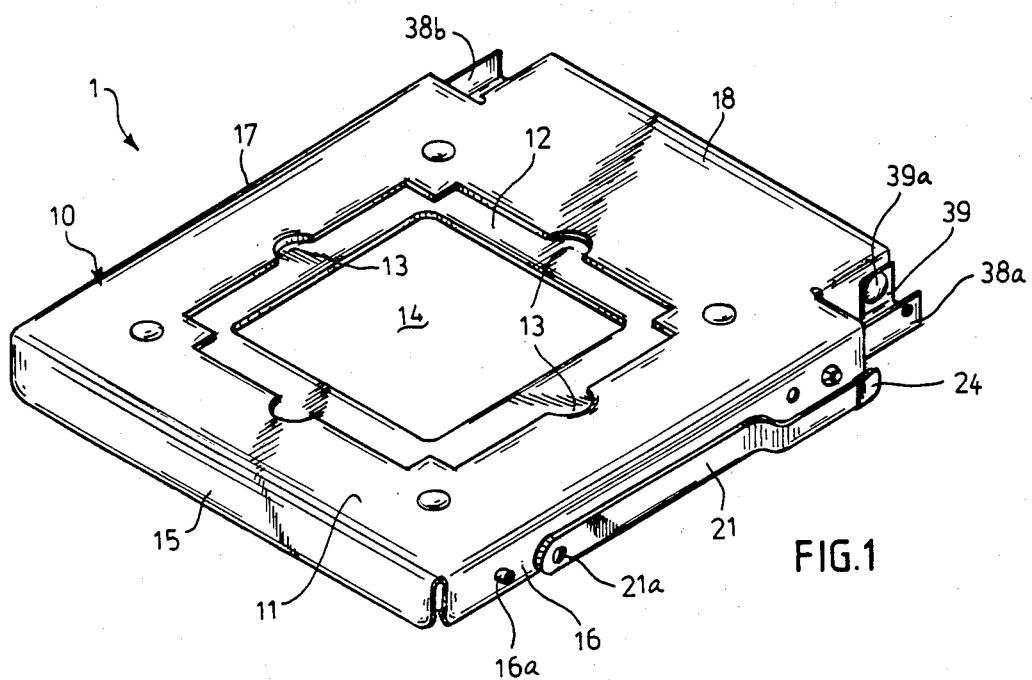
FIG. 1 is a perspective view of the device in the collapsed or storage position.
Figure 8:
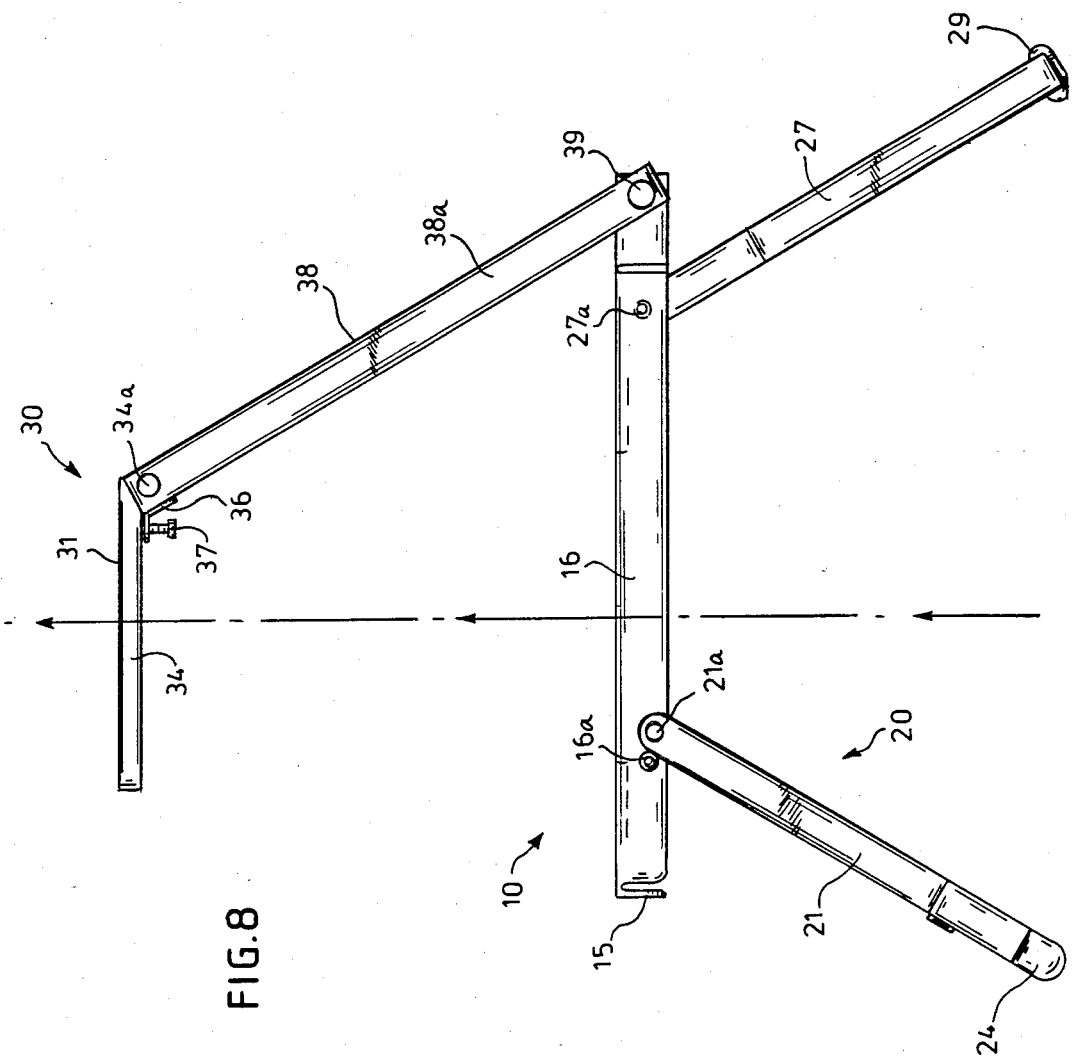
FIG. 8 is a side view of the device in its fully unfolded configuration.

Referring now to FIGS. 1-9, the device 1 in accordance with the present invention is foldable from the collapsed state shown in FIG. 1 to the unfolded or assembled state shown in FIG. 8 by way of intermediate steps as will be explained hereinafter.

Figure 3:
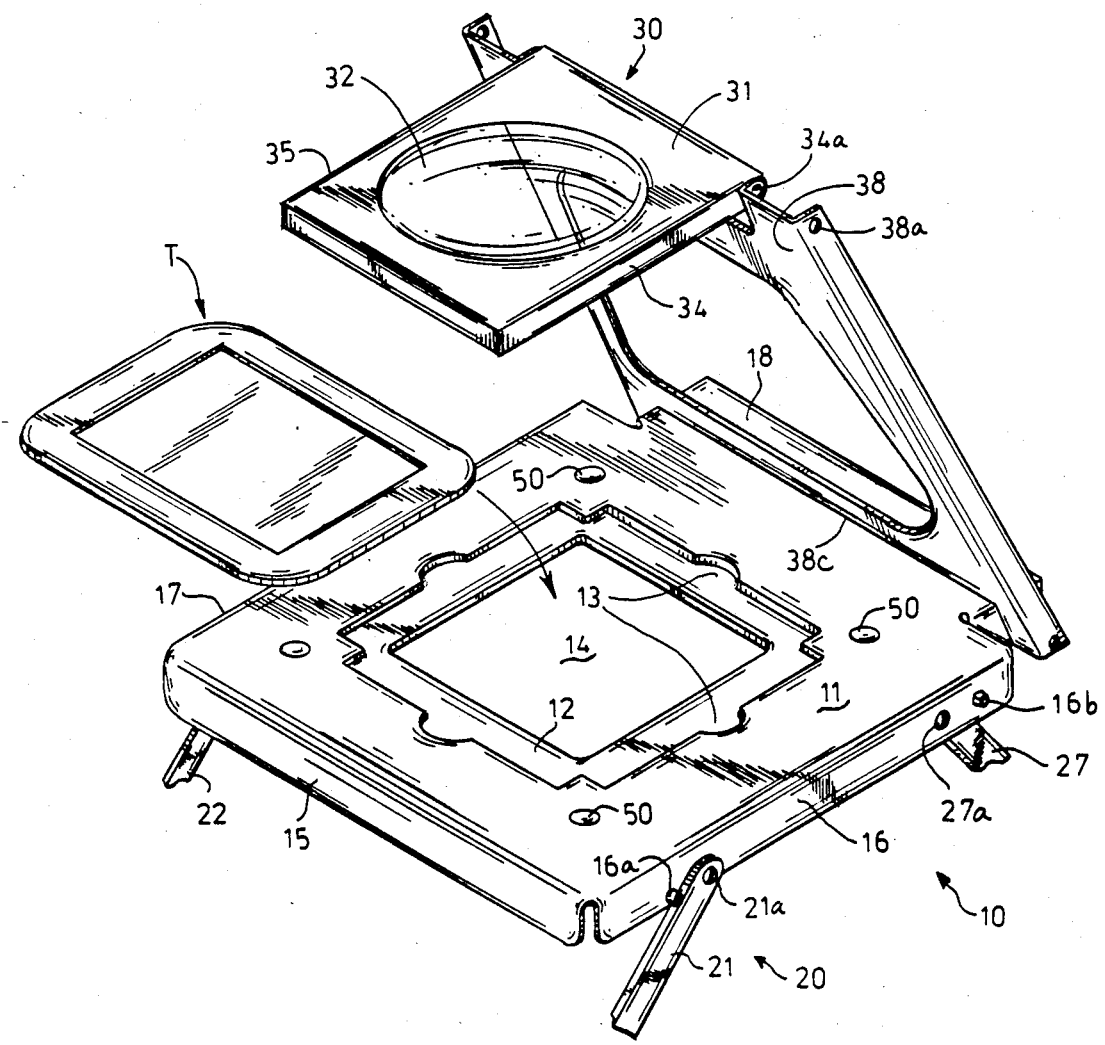
FIG. 3 is a perspective view of the device showing the placement of the transparency.
Figure 6:
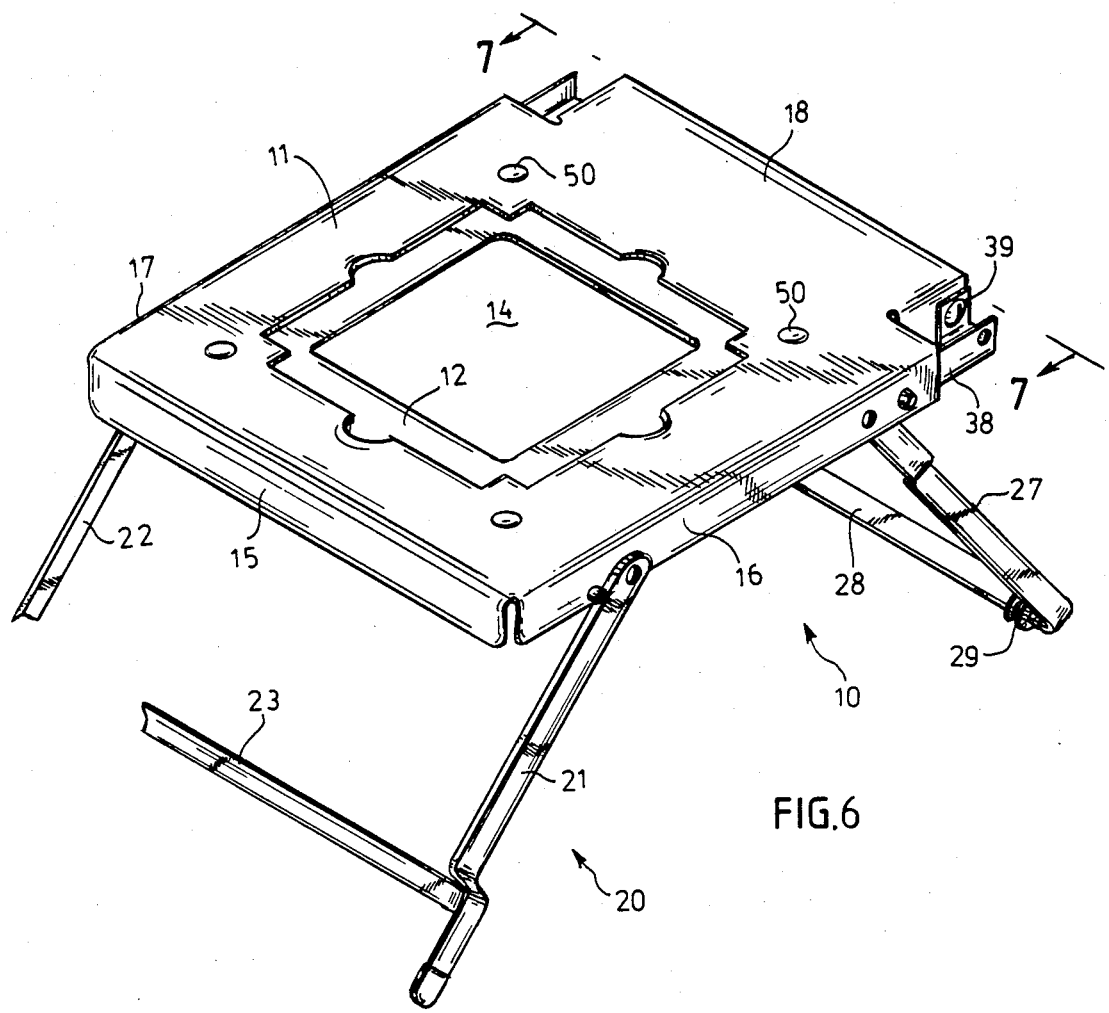
FIG. 6 is a perspective of the device in a partially unfolded state.
Figure 7:
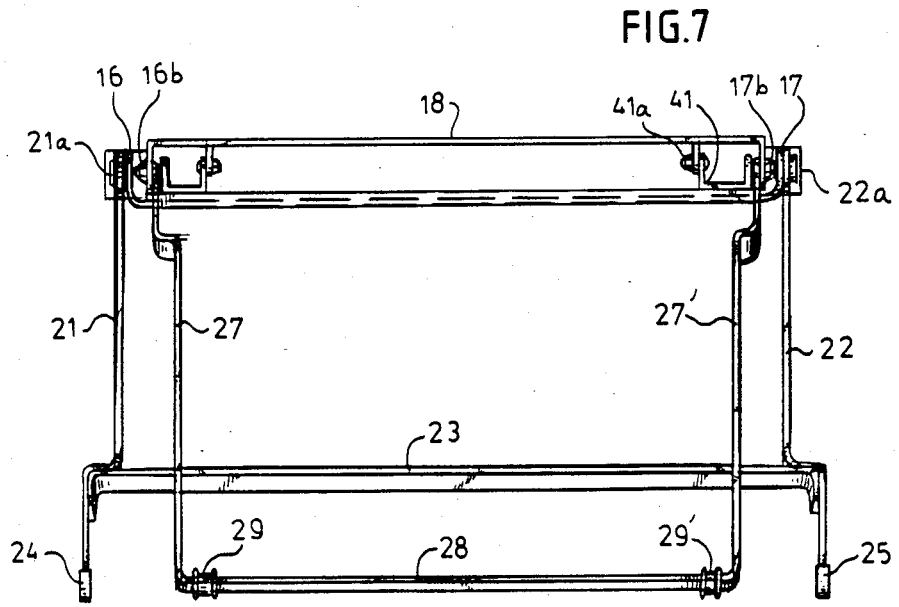
FIG. 7 is a rear view of the device along line VII—VII in FIG. 6.

The device 1 includes a base or table 10 which has a planar top surface 11, side walls 15, 16 and 17 and a rear portion 18. At a central portion of the top surface 11 is an indentation 12 for receiving a transparency T as shown in FIG. 3. Finger spaces 13 are provided to facilitate the removal of the transparency after it is in place. The central part of the indentation 12 has a mask or aperture 14 through which light passes from the top surface of an overhead projector and through the transparency as shown by line P in FIG. 8. In a preferred embodiment the indentation or recess 12 is sized to receive a transparency such as the Polaroid 691 transparency.

Connected to side walls 16 and 17 of base 10 are leg means 20 including a first pair of leg members 21, 22 which are joined by a cross member 23 and a second pair of leg members 27, 27' which are joined by cross member 28. Members 21 and 22 have rubber feet 24 and 25 thereon and cross member 28 has rubber members 29 and 29' thereon so that the device does not scratch or otherwise damage the top surface of an overhead projector during use.

Figure 4:
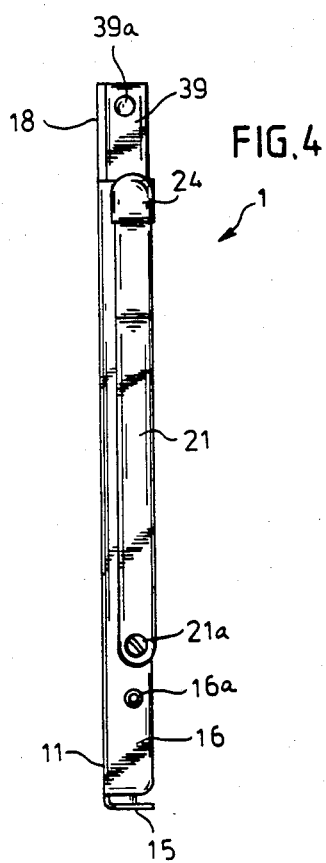
FIG. 4 is a side view of the device in the collapsed state.
Figure 5:
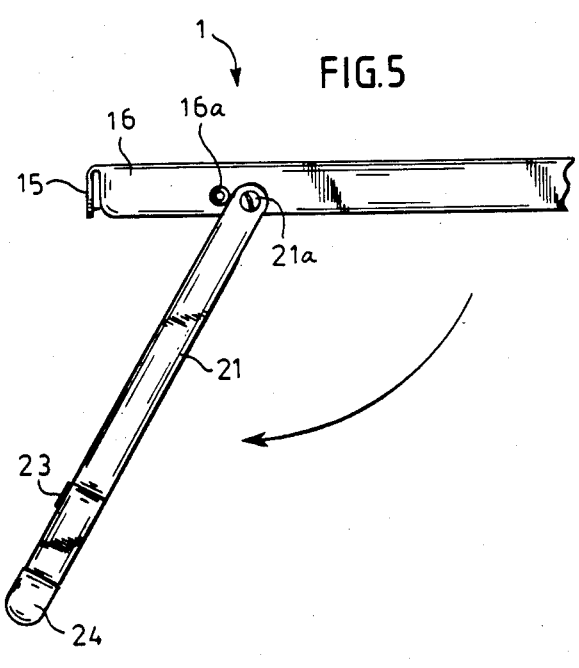
FIG. 5 is a side view of the base and a portion of the leg means.

Leg members 21 and 22 are pivotally connected at pivot axes 21a, 22a for movement from the position shown in FIG. 4 to the position shown in FIG. 5. The full extent of pivoting movement of leg members 21 and 22 is defined by stop member 16a on side 16 and a corresponding stop member (not shown) on side 17.

Figure 2:
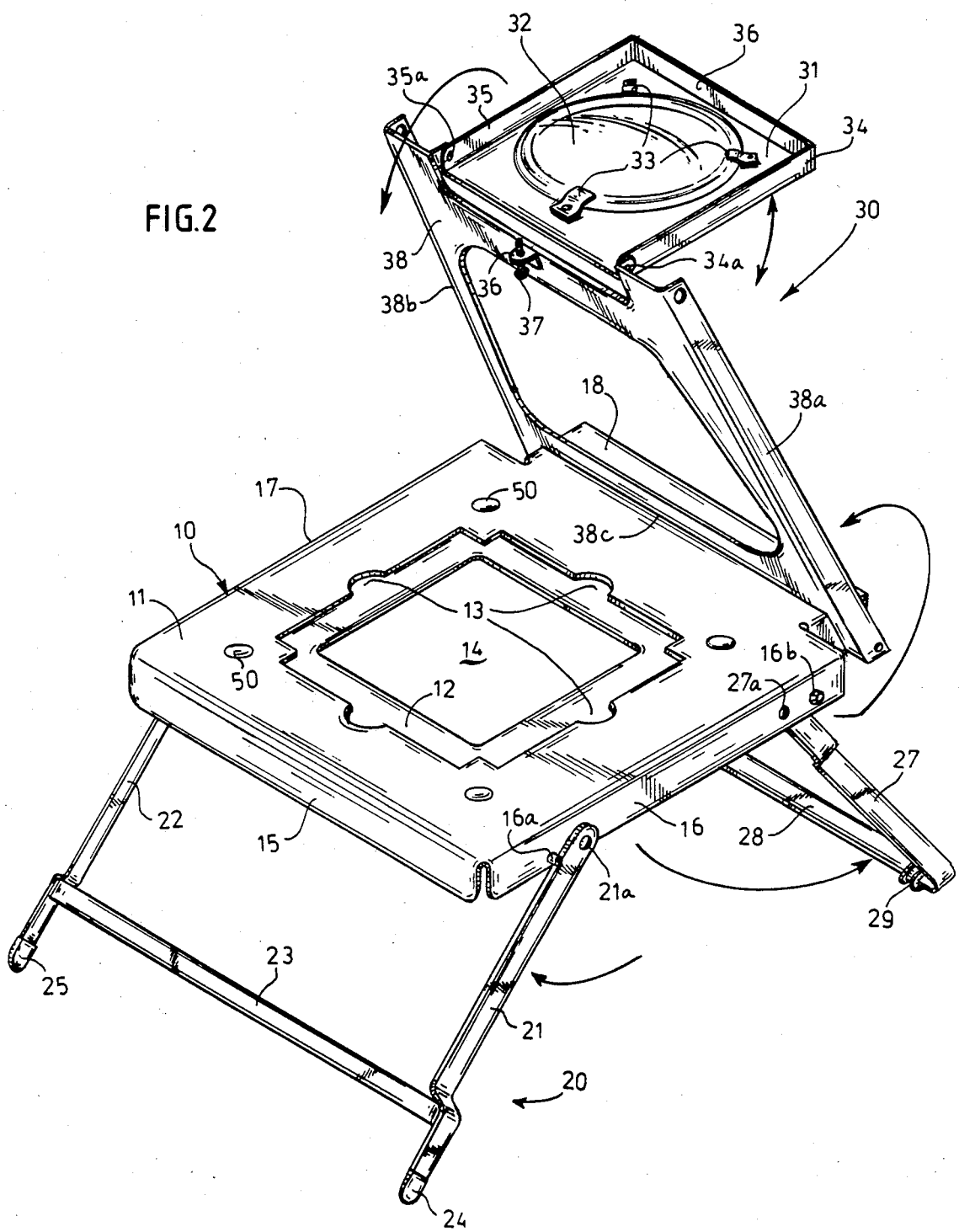
FIG. 2 is a perspective view of the device in an almost fully unfolded condition.

Similarly, leg members 27 and 27' are movable from a storage position wherein the leg members are positioned parallel to and adjacent the lower surface of the base to the position shown in FIG. 2 about pivot axes 27a on side 16 and a corresponding pivot on side 17. The extent of the pivoting movement is limited by stop members 16b and 17b.

A focusing lens 32 is held by members 33 in a planar lens holder 31 having side walls 34 and 35 and a front wall 36. The holder 31 is pivotal about pivot axes 34a and 35a on connecting member 38 which includes side walls 38a and 38b. Spaced inwardly of side walls 38a and 38b are respective depending tabs 39 and 41 (FIG. 7) which are pivotally connected to rear portion 18 of the base 10 at pivot points 39a and 41a. Connecting member 38 is pivotable from the position shown in FIG.

6 to the position shown in FIG. 2. The planar lens holding member 31 pivots from the completely folded position shown in FIG. 1 and FIG. 6, to the position shown in FIG. 2 whereupon it is then pivoted into the position shown in FIG. 3 and FIG. 8.

The pivotable movement of member 38 is limited by the impact of edge 38c against end portion 18 whereas the pivoting movement of member 31 is limited by a stop screw 37 held in angle member 36 and which is adjustable to properly obtain the positioning of the lens in a parallel position with the base surface 11.

Figure 9:
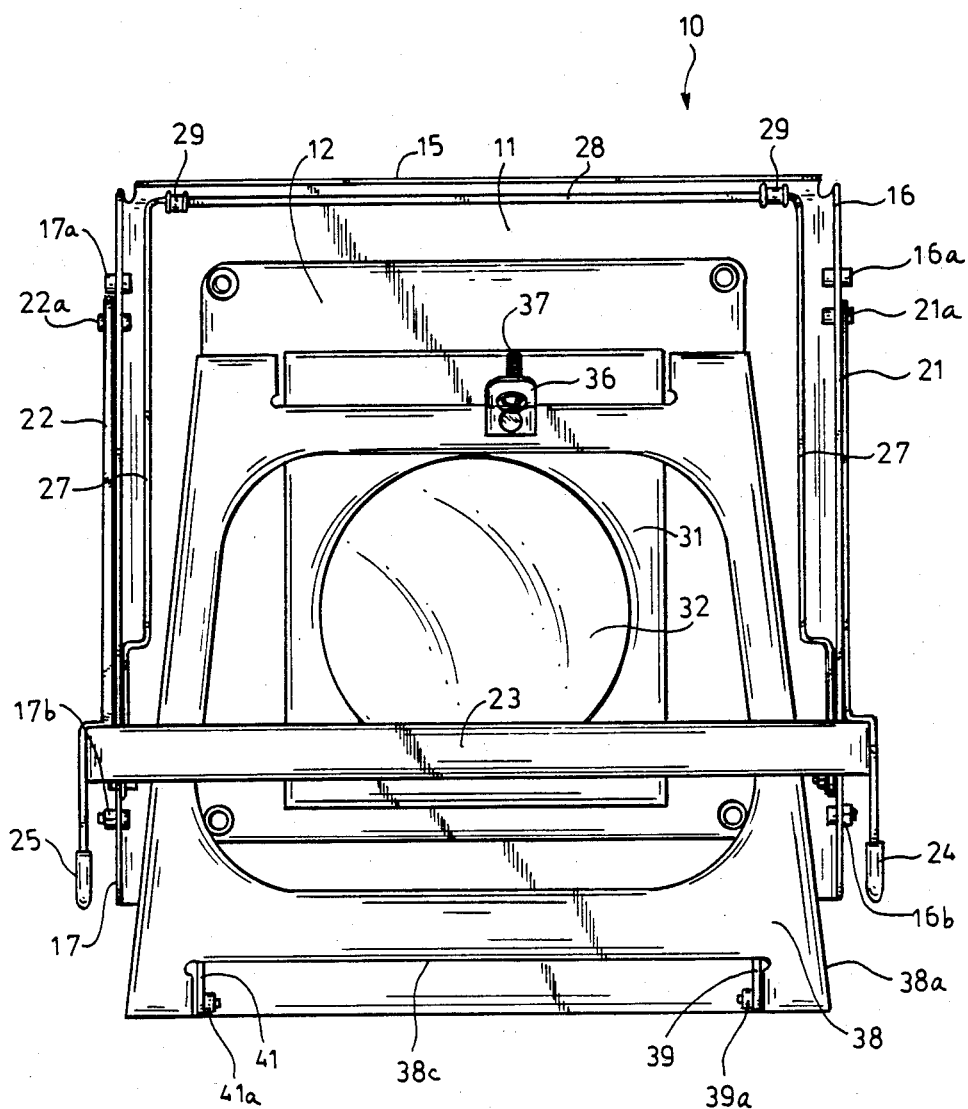
FIG. 9 is a bottom plan view showing the elements comprising the device in the folded condition.

In use, the unit is taken in the fully collapsed or storage condition shown in FIGS. 1 and 9. It is noted that the width of the connecting member 38 is less than the distance between the legs 27, 27' to permit the connecting member to nest between the legs and assume a position parallel to and adjacent the base in the folded position. Similar comments apply to the lens holder 31 which is received between side walls 38a, 38b. Moreover, the height of the side walls of the lens holder and connecting member are slightly smaller than the height of the base side walls so all the foldable members lie within the base when in the collapsed state.

To use the unit, the leg members 21, 22 are first pivoted downwardly to the position shown in FIG. 2 wherein the edge of the leg members engage the respective stops. Thereafter, the connecting member 38 along with lens holding member 31 are pivoted upwardly to the respective positions shown in FIG. 2. The leg members 27, 27' may then be unfolded to the position shown in FIG. 2.

Finally, the lens holding member 31 is pivoted to the position shown in FIG. 3 so that the entire unit shown in FIG. 8 can be placed on the top of an overhead projector and light can pass through along line P through a transparency T placed in indentation 12, through the lens 32 and into the overhead lens of the overhead projector. Lens 32 ensures the proper focusing of the image of the transparency projector 1 on the lens proper, whereas the predetermined pivoting movement of the leg means as shown in FIG. 8 set the proper distance of the transparency from the top surface of the overhead projector for the particular lens 32 that is used.

The support may be placed in the collapsed state or condition by reversing the above procedure.

It will be appreciated that the instant specification and claims are set forth by way of illustration and not limitation, and that various modifications and changes may be made without departing from the spirit and scope of the present invention. For example, the mask defining the aperture 14 may be made interchangeable to vary the size of the aperture to accommodate differently sized transparencies. Quick release screws 50 may be provided to permit the quick interchangeability of such masks.

What is claimed is:

1. A device for supporting a transparency on a top surface of an overhead projector, the device comprising:
   a planar base having means for receiving a transparency;
   leg means mounted on the base for pivotal movement from a storage position to a support position wherein the leg means supports the base parallel to and spaced a predetermined distance from the top surface of an overhead projector;
   lens holding means pivotally mounted on the base and having a planar lens holding member movable from a storage position to a working position wherein the lens holding member is parallel to and spaced from the base in alignment with the transparency receiving means;
   whereby the device is foldable into a desired working configuration and is collapsible into a compact structure for storage.

2. The device according to claim 1, wherein the planar base comprises a planar surface having an indentation therein configured to receive a transparency and a mask defining a central aperture through which light passes through the base and the transparency when in position.

3. The device according to claim 2, wherein a plurality of interchangeable masks are provided, and holding means for releasably connecting a desired mask to said base.

4. A device according to claim 1, wherein the planar base includes side walls depending downwardly therefrom and wherein the leg means comprises a first pair of leg members pivotally connected to the sides of the planar base and a second pair of leg members pivotally connected to the sides of the planar base.

5. A device according to claim 4, in which said first paid of leg members is connected to the outer surfaces of said side wall and said second pair of leg members is connected to the inner surfaces of said side walls, whereby said first and second pair of leg members are movable to positions parallel to and adjacent said base when in the storage position.

6. The device according to claim 1, wherein the lens holding means comprises a connecting member pivotally connected to the base and pivotally connected to the lens holding member for positioning the lens holding member parallel to the base.

7. The device according to claim 6, in which the width of said connecting member is smaller than the distance between said second pair of leg members, whereby said connecting member nests between the leg members comprising said second pair of leg members when in the storage position.

* * * * *